United States Patent Office 2,769,830
Patented Nov. 6, 1956

2,769,830

PROCESS FOR PREPARING HEXAETHYLCYCLO-TRISILOXANE

Donald G. Dobay, Brecksville, Ohio, assignor to Union Carbide and Carbon Corporation, a corporation of New York No Drawing. Application December 29, 1953,
Serial No. 401,051

6 Claims. (Cl. 260—448.2)

This invention relates to a process for hydrolyzing diethyldichlorosilane. More particularly, the invention relates to a process for the controlled hydrolysis of diethyldichlorosilane to hexaethylcyclotrisiloxane which may be readily converted to relatively high molecular weight diethylsiloxane polymers.

It is known that relatively high molecular weight diethylpolysiloxanes, which have found numerous applications, are prepared by processes which include the hydrolysis of diethyldichlorosilanes to a hydrolyzate comprising a mixture of low molecular weight silanols and various cyclic siloxanes, and the subsequent treatment of such hydrolyzate to cause condensation of the silanols and rearrangement of the cyclic siloxanes to desirable polymeric products. In such processes, hydrolysis is generally conducted by either the water-ice, water-solvent or water-solvent-ice techniques, while condensation and rearrangement is normally effected by treatment with an alkaline catalyst, with or without the aid of heat.

Perhaps the outstanding difficulties attending use of the above processes for preparing diethylpolysiloxanes lie in the inability to control the hydrolysis reaction to the extent that a uniformly reactive hydrolyzate is obtained. More specifically, the hereinabove referred to methods of hydrolysis lead to the preparation of a mixture of various components some of which are unstable and others of which are immune to conversion or rearrangement to higher polymers. For example, the low molecular weight silanols present readily condense intermolecularly to higher molecular weight polymers. On the other hand, the stable cyclic siloxanes which are present in appreciable proportions are not, with the exception of the cyclic trimer, namely hexaethylcyclotrisiloxane, amenable to rearrangement to higher molecular weight polymers. Thus, substantial amounts of various cyclic siloxanes such as the cyclic tetramer, octaethylcyclotetrasiloxane, the cyclic pentamer, decaethylcyclopentasiloxane and their higher homologues are found in admixture with the high molecular weight polymers prepared by such processes.

The presence of higher molecular weight cyclic siloxanes in admixture with diethylsiloxane polymer products such as diethyl oils and resins is particularly undesirable as such siloxanes are comparatively volatile and volatilize when the oil or resin is subjected to elevated temperatures. It, therefore, becomes necessary to remove such cyclic siloxanes, which oftentimes comprise up to about 50% by weight of the product, before use.

Heretofore, extensive effort has been directed toward overcoming the disadvantages attending hydrolysis of diethyldichlorosilane and numerous methods and modifications of the known processes have been proposed. For example, it has been suggested that mixtures of solvents be employed and that the temperature of the reaction be controlled within well defined limits. Also suggested is the initial reaction of an alcohol with a chlorosilane and the subsequent hydrolysis of the alkoxysilane obtained thereby. Such methods and modifications although effective for the hydrolysis of certain chlorosilanes and mixtures thereof, are not entirely satisfactory when applied to the hydrolysis of diethyldichlorosilane.

The cyclic trimer of ethylsiloxane namely hexaethylcyclotrisiloxane is perhaps the most interesting intermediate presently obtained in hydrolysis reactions. Such cyclic trimer, although prepared in relatively small amounts by known hydrolysis processes, is found to be relatively stable under normal conditions while at the same time it may be readily converted or rearranged to a high molecular weight diethylsiloxane polymer by treatment with an alkaline or acid catalyst. It is, therefore, an object of this invention to provide a process whereby substantial quantities of hexaethylcyclotrisiloxane are obtained by the hydrolysis of diethyldichlorosilane.

The object of this invention is acomplished by conducting the hydrolysis of diethyldichlorosilane in a medium comprising a mixture of critical proportions of water and a completely water soluble aliphatic monohydric alcohol. The relative amounts of water and alcohol comprising the medium must lie within the range of from about 3 parts by volume of water to about 1 part by volume of alcohol to from about 9 parts by volume of water to 1 part by volume of alcohol. It is of extreme importance that the relative amounts of water and alcohol employed be maintained within the defined limits as otherwise the hydrolysis will not be directed toward the production of substantial quantities of hexaethylcyclotrisiloxane. As the preparation of hexaethylcyclotrisiloxane is primarily a function of the water to alcohol ratio, the amount of medium employed may vary within wide limits. Generally, the medium should be employed in an amount by volume of at least one-fourth of the volume of diethyldichlorosilane, and normally the volume of the hydrolysis medium will equal or exceed that of the silane.

The completely water soluble monohydric alcohols which may be employed in the present invention include methanol, ethanol, propanol, isopropanol, and the etheralcohols such as ethylene glycol monomethyl ether, ethylene glycol monoethyl ether, ethylene glycol monobutyl ether and the like.

In the practice of my invention hydrolysis may be conducted by placing the hydrolysis medium in a flask and by slowly adding diethyldichlorosilane thereto. As the hydrolysis reaction is exothermic, heat is evolved and, therefore, it will be convenient for practical purposes to initiate the reaction at moderately low temperatures, for example, from about 0° C. to about 25° C., and permit the temperature to rise to reflux. During hydrolysis hydrogen chloride is prepared and a major portion thereof will evolve from the hydrolyzate. The siloxane product is water immiscible and may readily be removed. The siloxane product is generally washed with water to remove traces of hydrogen chloride and alcohol present therein. Hexaethylcyclotrisiloxane is removed from the product by fractional distillation. The following examples more fully disclose the invention:

*Example I*

To a three-neck, round bottom, one liter flask equipped with a condenser, thermometer, dropping funnel and stirrer were poured 200 ml. of a water-methanol mixture comprising 180 ml. of water and 20 ml. of methanol. There was then added in dropwise fashion 200 ml. of diethyldichlorosilane. The contents of the flask were continuously stirred during the addition of diethyldichlorosilane and the temperature thereof rose from room temperature to reflux temperature (65° C.). After the addition, stirring was continued for approximately 2½ hours while the temperature slowly dropped to approximately 26° C. The siloxane phase was separated, washed free of hydrogen chloride and alcohol and hexaethylcyclotrisiloxane removed by fractional distillation at a reduced pressure. A yield of 81.0 grams of hexaethylcyclotrisiloxane was obtained.

*Example II*

To a three-neck, round bottom, one liter flask equipped with a condenser, thermometer, dropping funnel and stirrer were poured 200 ml. of a water-methanol mixture comprising 150 ml. of water and 50 ml. of methanol. The flask was placed in an ice bath and there was then added in dropwise fashion 200 ml. of diethyldichlorosilane. The contents of the flask were continuously stirred during the addition of diethyldichlorosilane and the temperature thereof rose to reflux (62° C.). After the addition, stirring was continued for approximately 2½ hours during which time the temperature slowly dropped to about 5° C. The siloxane phase was separated, washed free of hydrogen chloride and alcohol and hexaethylcyclotrisiloxane removed by fractional distillation at a reduced pressure. A yield of 83.6 grams of hexaethylcyclotrisiloxane was obtained.

The critical nature of the water to alcohol ratio of the hydrolysis medium employed to obtain large quantities of hexaethylcyclotrisiloxane is clearly evident by noting the results obtained from the hydrolysis of diethyldichlorosilane with a medium having a water to alcohol ratio outside of the defined limits of the invention. For example, 200 ml. of diethyldichlorosilane was hydrolyzed with 200 ml. of a medium comprising 50 ml. of water and 150 ml. of methanol and there was obtained a yield of 9.5 grams of hexaethylcyclotrisiloxane. This yield of hexaethylcyclotrisiloxane is approximately 10% of the yield of the compound obtained by the process of the instant invention.

The hydrolysis of diethyldichlorosilane, with a medium comprising the hereinabove defined critical amounts of water and a completely water soluble aliphatic monohydric alcohol to yield substantially only hexaethylcyclotrisiloxane is not applicable to the hydrolysis of other hydrocarbon substituted chlorosilanes. That is, for example, the hydrolysis of dimethyldichlorosilane with such critical amounts of an alcohol-water medium will not yield high quantities of hexamethylcyclotrisiloxane. Moreover, it has been found that the hydrolysis of hydrocarbon substituted monochloro- and trichlorosilanes either alone or in admixture with other chlorosilanes, including diethyldichlorosilane, by the process of this invention will not yield appreciable amounts of cyclic siloxane trimer.

What is claimed is:

1. An improved process for preparing hexaethylcyclotrisiloxane by the hydrolysis of diethyldichlorosilane which comprises mixing diethyldichlorosilane, substantially free of other hydrolyzable silanes, with water and an aliphatic alcohol as the hydrolysis medium, said aliphatic alcohol being completely water soluble and containing only hydrogen, oxygen and carbon atoms and having only a single hydroxyl group therein, said water being present in said medium in an amount by volume of from about 3 parts of water to about 9 parts of water per part of alcohol.

2. An improved process for preparing hexaethylcyclotrisiloxane by the hydrolysis of diethyldichlorosilane which comprises mixing diethyldichlorosilane, substantially free of other hydrolyzable silanes, with water and methanol as the hydrolysis medium, said water being present in said medium in an amount by volume of from about 3 parts of water to about 9 parts of water per part of methanol.

3. An improved process for preparing hexaethylcyclotrisiloxane by the hydrolysis of diethyldichlorosilane which comprises mixing diethyldichlorosilane, substantially free of other hydrolyzable silanes, with water and an aliphatic alcohol as the hydrolysis medium, said aliphatic alcohol being completely water soluble and containing only hydrogen, oxygen and carbon atoms and having only a single hydroxyl group therein, said water being present in said medium in an amount by volume of from about 3 parts of water to about 9 parts of water per part of alcohol and recovering hexaethylcyclotrisiloxane.

4. An improved process for preparing hexaethylcyclotrisiloxane by the hydrolysis of diethyldichlorosilane which comprises adding diethyldichlorosilane, substantially free of other hydrolyzable silanes, to water and an aliphatic alcohol as the hydrolysis medium, said aliphatic alcohol being completely water soluble and containing only hydrogen, oxygen and carbon atoms and having only a single hydroxyl group therein, said water being present in said medium in an amount by volume of from about 3 parts of water to about 9 parts of water per part of alcohol.

5. An improved process for preparing hexaethylcyclotrisiloxane by the hydrolysis of diethyldichlorosilane which comprises adding diethyldichlorosilane, substantially free of other hydrolyzable silanes, to water and methanol as the hydrolysis medium, said water being present in said medium in an amount by volume of from about 3 parts of water to about 9 parts of water per per of methanol.

6. An improved process for preparing hexaethylcyclotrisiloxane by the hydrolysis of diethyldichlorosilane which comprises adding diethyldichlorosilane, substantially free of other hydrolyzable silanes, to water and an aliphatic alcohol as the hydrolysis medium, said aliphatic alcohol being completely water soluble and containing only hydrogen, oxygen and carbon atoms and having only a single hydroxyl group therein, said water being present in said medium in an amount by volume of from about 3 parts of water to about 9 parts of water per part of alcohol and recovering hexaethylcyclotrisiloxane.

References Cited in the file of this patent

UNITED STATES PATENTS

| | | |
|---|---|---|
| 2,265,962 | Bent | Dec. 9, 1941 |
| 2,398,672 | Sauer | Apr. 16, 1946 |
| 2,415,389 | Hunter | Feb. 4, 1947 |
| 2,486,162 | Hyde | Oct. 26, 1949 |

FOREIGN PATENTS

| | | |
|---|---|---|
| 635,995 | Great Britain | Apr. 19, 1950 |
| 864,152 | Germany | Jan. 22, 1953 |
| 888,851 | Germany | Sept. 7, 1953 |